ns of a selected parameter. A reference mounting supports the parameter responsive structure and either a magnet element or Hall effect transducer is secured relative to the reference mounting or housing in alignment with a selected direction of a component of motion and displacement caused by expansion and contraction of the parameter responsive structure. The other of said magnet element and Hall effect transducer is mounted for relative displacement along said selected direction in response to expansion and contraction of the parameter responsive structure. The magnet element and linear Hall effect transducer are juxtaposed relative to each other for variable spacing in response to changes in the selected parameter by expansion and contraction of the parameter responsive structure. An HET enhancer in the form of a magnet receiver sleeve of magnetically permeable material enhances the linearity and sensitivity of the HET voltage response to magnet element displacement. The invention is applied by way of example to barometers, altimeters, hygrometers, pressure gauges and force gauges using parameter responsive structures such as ambient pressure responsive bellows and capsules, ambient humidity responsive tubes or hollow cylinders of hydroscopic material, Bourdon tubes and pressure tubes of various configurations, and force gauge proving rings.

United States Patent [19]
Baer

[11] Patent Number: 4,667,514
[45] Date of Patent: May 26, 1987

[54] PARAMETER SENSORS AND MONITORS
[76] Inventor: John S. Baer, Schooner Head, Bar Harbor, Me. 04609
[21] Appl. No.: 729,280
[22] Filed: May 1, 1985
[51] Int. Cl.[4] .......................... G01L 7/12; G01L 9/14
[52] U.S. Cl. .................................. 73/386; 73/DIG. 3; 73/337; 73/728; 73/729; 73/735; 73/779; 338/32 H; 338/42
[58] Field of Search ........... 73/728, 722, 730, DIG. 3, 73/386, 387, 384, 178 R, 735, 170 R, 753, 337, 336.5, 763, 779

[56] References Cited
U.S. PATENT DOCUMENTS

| | | |
|---|---|---|
| 4,077,262 | 3/1978 | Cholet .................................. 73/722 |
| 4,287,762 | 9/1981 | Baer .................................. 73/178 R |
| 4,352,085 | 9/1982 | Herden .................................. 338/42 |

Primary Examiner—Donald O. Woodiel
Attorney, Agent, or Firm—Daniel H. Kane, Jr.

[57] ABSTRACT

Parameter sensors and monitors are described incorporating one of a variety of parameter responsive structures constructed and arranged for expansion and contraction causing a component of motion and displacement along at least one direction in response to varia- 33 Claims, 37 Drawing Figures

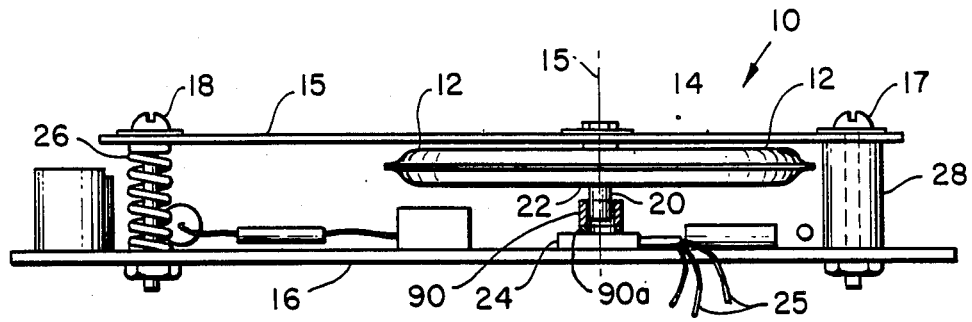
FIG. 1
FIG. 1A
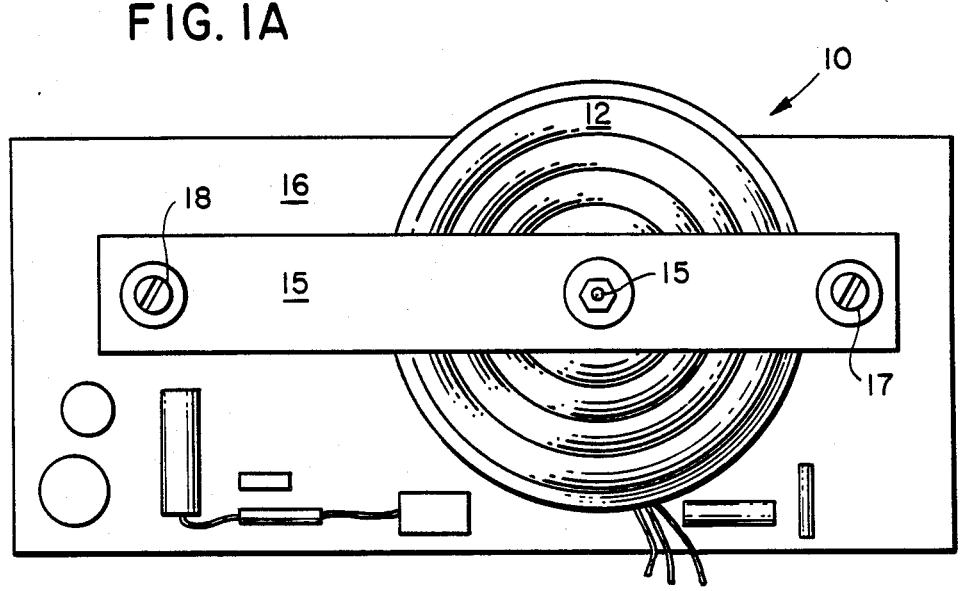
FIG. 2
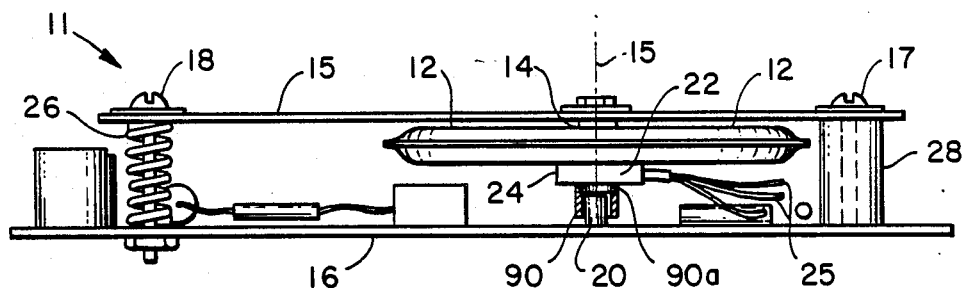
FIG. 3

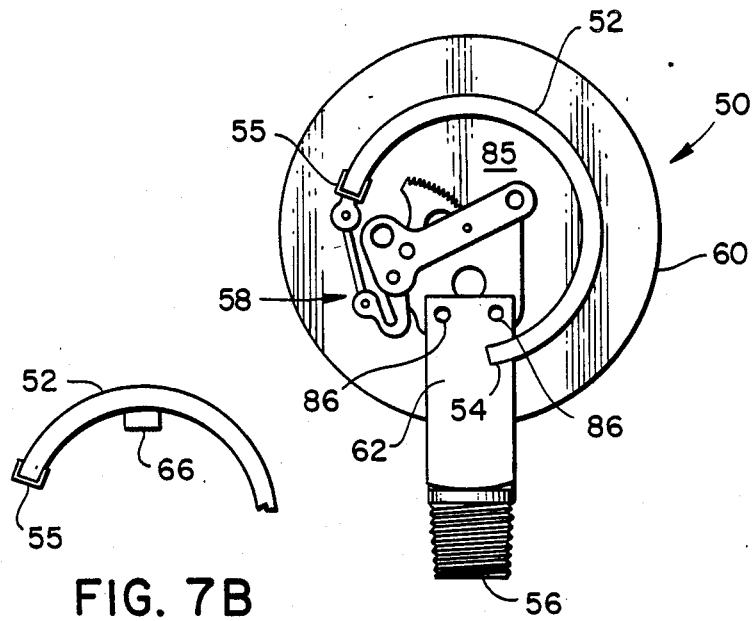
FIG. 7B
FIG. 6 (PRIOR ART)
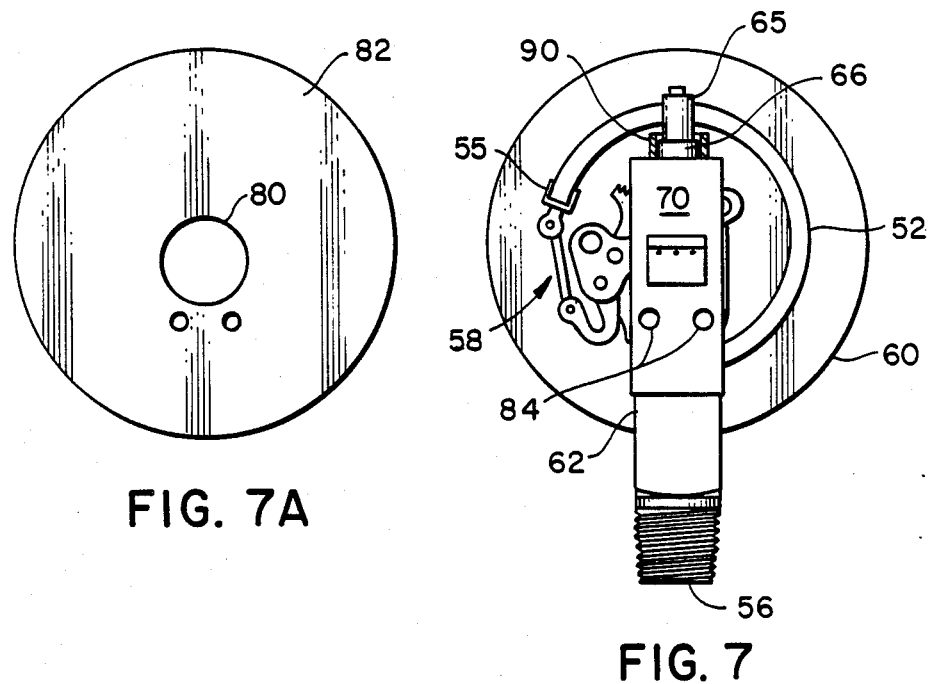
FIG. 7A
FIG. 7

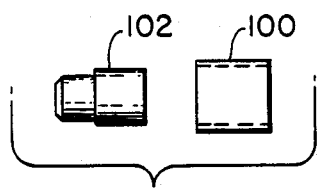
FIG. 11
FIG. 11A
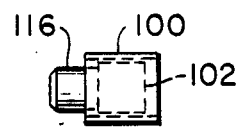
FIG. 12
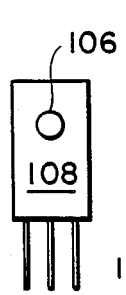
FIG. 14B
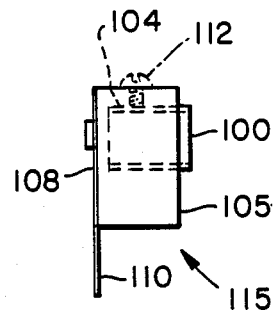
FIG. 14
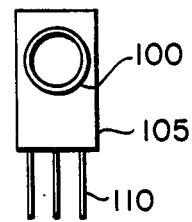
FIG. 14A
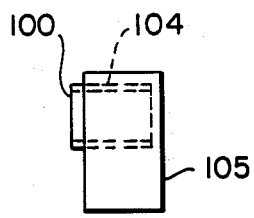
FIG. 13
FIG. 13A
(PRIOR ART)
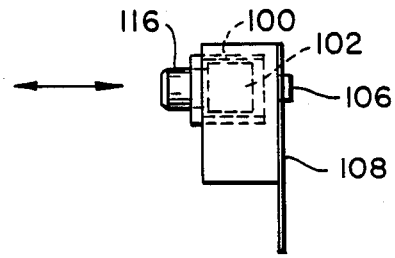
FIG. 16
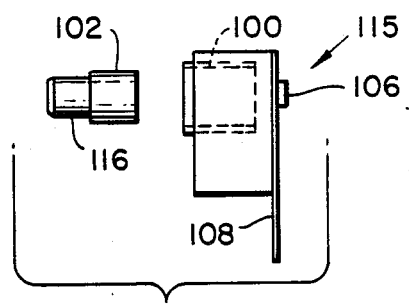
FIG. 15

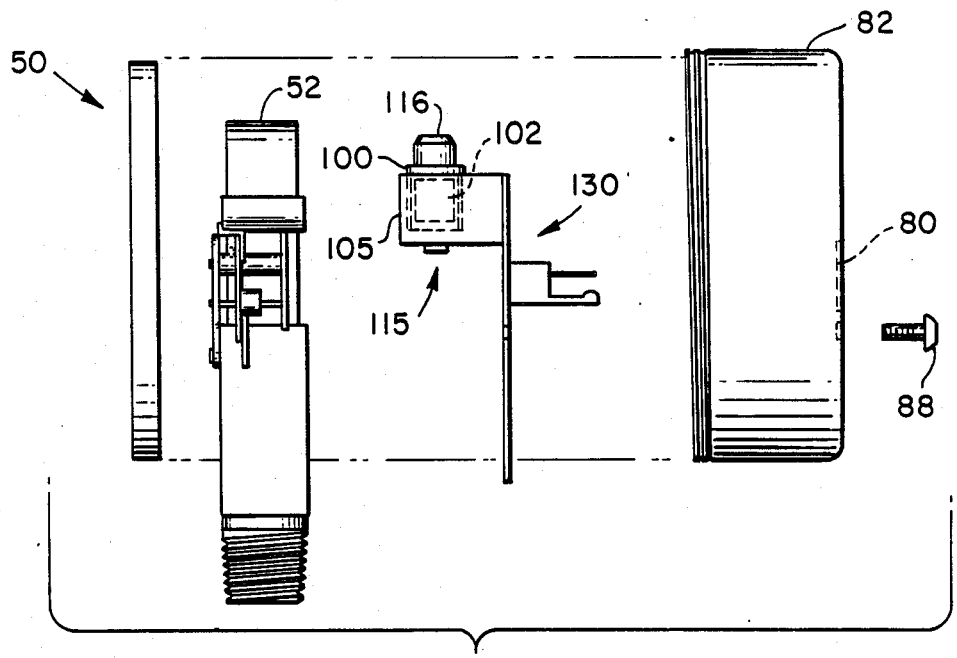
FIG. 19
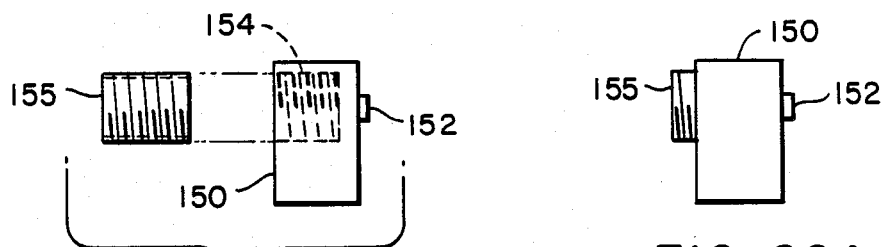
FIG. 20
FIG. 20A
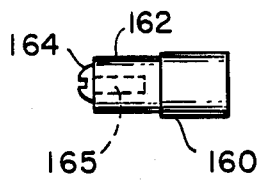
FIG. 21
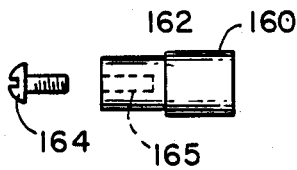
FIG. 21A
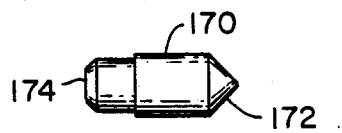
FIG. 22

PARAMETER SENSORS AND MONITORS

TECHNICAL FIELD

This invention relates to a variety of new parameter sensors and monitors useful in parameter measuring instruments such as weather instruments and for providing electrical signal outputs suitable for processing, for example, for digital readout. More generally the invention provides new Hall effect transducer assemblies for application not only in weather parameter sensors and monitors but also in a variety of condition sensing instruments and displacement transducers including pressure gauges, ring force gauges, weighing scales, temperature gauges, altimeters, etc. In each instance, the invention provides electrical signals suitable for analog or digital processing, including for example, processing for digital readout.

BACKGROUND ART

U.S. Pat. No. 4,287,762 describes a digital electronic weather center or weather monitor with digital display and circuitry for selecting and displaying any of a number of monitored weather functions such as indoor and outdoor temperatures, pressure, wind speed and direction, rainfall, and humidity. The weather parameters are monitored by various ambient condition sensing transducers coupled to the weather center circuitry. The transducers generally utilize the rotational motion or other displacement of a respective parameter responsive structure and incorporate visible calibration marks for example in a digital code pattern to be read by a stationary optical reader or photodetector which provides electrical output signals for processing. The optical reading techniques described in U.S. Pat. No. 4,287,762 generally transform analog devices typically employing as the movable analog element a rotatable shaft into digital readout devices and are applicable not only to weather transducers but condition sensing instrumentation generally.

OBJECTS OF THE INVENTION

It is an object of the present invention to provide new parameter sensors and monitors and new displacement transducer assemblies for converting and transforming mechanical analog devices to electrical signal producing transducer devices. The invention provides electrical signal output suitable for analog or digital processing, including for example, processing for digital readout and is applicable for incorporation in new instruments and devices and for retrofitting existing devices.

Another object of the invention is to provide parameter sensors and monitors and transducer assemblies sensitive to displacement, motion, or position and which utilize magnetic sensing and pickup rather than optical sensing and reading for generating electrical signal outputs corresponding to the monitored parameter or condition. In particular the invention provides new Hall effect transducer assemblies, including HET enhancers and transducer assembly arrangements for enhancing the Hall sensor voltage output response, sensitivity, linear range, etc.

A further object of the invention is to provide new parameter sensors and monitors useful for example in sensing ambient weather conditions, and new displacement or position sensitive transducer assemblies for application in a variety of condition sensing and parameter measuring instrumentation, for generating electrical output signals with fewer parts and at lower cost.

DISCLOSURE OF THE INVENTION

In order to accomplish these results the present invention generally provides a parameter responsive structure constructed and arranged for expansion and contraction causing a component of motion or displacement along at least one direction in response to variations of a selected parameter. A reference mounting supports the parameter responsive structure or the structure itself provides a reference locus. The invention also provides a magnet element and a linear Hall effect transducer (HET) or Hall sensor with one of the magnet element and Hall effect transducer being secured relative to the reference mounting or reference locus in alignment with a selected direction of a component of motion or displacement caused by expansion and contraction of the parameter responsive structure. The other of the magnet element and Hall effect transducer is mounted for translation or displacement along the selected direction of displacement in response to the expansion and contraction of the parameter responsive structure.

According to the invention, the magnet element and linear Hall effect transducer are mounted in spaced juxtaposition relative to each other for variable spacing in response to changes in a parameter causing expansion and contraction of the parameter responsive structure. In response to this variable spacing of the magnet element and its accompanying magnetic field relative to the Hall sensor, the linear Hall effect transducer generates a variable output signal corresponding to variations in the selected parameter. The invention further provides a novel HET enhancer in association with the magnet element and Hall effect transducer for enhancing the linearity and sensitivity of voltage output from the HET in response to displacement of the magnet element. The HET enhancer may take the form of a magnet element receiver of magnetically permeable material such as a sleeve or tube section mounted adjacent to the Hall effect transducer.

A variety of parameter responsive structures are contemplated by the present invention including barometer and altimeter bellows and capsules, Bourdon tubes including "C" tubes, twist tubes and helical or spiral tubes, ring force gauges, moisture and temperature responsive material structures, and generally parameter responsive structures of any geometry including linear, surface, volumetric or bulk, twisted, helical, and curved structures of both simple and compound curvature etc. A variety of reference mountings and housings are also contemplated by the invention which incorporate variable coupling arrangements for varying and adjusting the spacing between the magnet element and Hall effect transducer to establish a desired initial spacing.

For example, for sensing and monitoring ambient humidity the present invention provides for the parameter responsive structure an elongate tube or hollow cylinder of hydroscopic plastic material for expansion and contraction along the elongate axis of the tube or hollow cylinder in response to variations in ambient humidity. The reference mounting may comprise a base, a first projecting support for mounting and supporting one end of the tube in fixed position with the other end freely extending, and a second projecting support spaced from the free end of the tube or hollow cylinder in alignment with the elongate axis. The magnet element is secured at the free end of the tube or hollow cylinder and the Hall effect transducer is mounted on the second projecting support spaced from the magnet element in alignment with the elongate axis of the tube or hollow cylinder. Either of the projecting supports is adjustably secured to the base for sliding adjustment of its position to vary and set the initial spacing between the magnet element and Hall effect transducer.

For barometers and altimeters, the reference mounting may comprise a base and a substantially parallel support spaced from the base with a variable coupling such as an adjustable threaded spacing screw between the substantially parallel base and support. The evacuated bellows or capsule is secured at its center on one side to the substantially parallel support with the magnet element secured to the center of the bellows on the other side. The Hall effect transducer is secured to the base in alignment with the center axis of the bellows. Upon expansion and contraction of the bellows along its center axis in response to variations in ambient pressure or altitude, the Hall effect transducer generates a corresponding variable output.

In a number example embodiments of the present invention providing a pressure gauge the parameter responsive structure may be a Bourdon tube such as a "C" tube in the configuration of an arc fixed at one end to the reference mounting or gauge housing and in which the selected direction of motion or displacement caused by expansion and contraction is approximately a chord of the arc at any desired location along the arc. According to one example embodiment, the magnet element is secured to the arc of the Bourdon tube along the selected chord of the arc and the Hall effect transducer is secured to the housing with reference to the fixed end of the arc of the Bourdon tube.

A feature and advantage of this embodiment of the invention is that the new transducer assembly may comprise a "kit" for retrofitting conventional mechanical analog pressure gauges which use the Bourdon tube. The retrofitting kit converts or transforms the conventional mechanical analog pressure gauge for electrical signal output suitable for processing, for example, for digital readout. The retrofitting kit includes a first bracket with the magnet element secured to the bracket, for engaging and coupling the bracket and magnet element to the arc of the Bourdon tube. Alternatively, the magnet element may be adhesively bonded directly to the Bourdon tube. A second bracket is constructed and arranged for coupling the Hall effect transducer relative to the pressure gauge housing and the fixed end of the Bourdon tube. The two brackets mount the Hall effect transducer and magnet element in juxtaposition relative to each other for variable spacing or displacement upon expansion and contraction of the Bourdon tube along the selected chord of the arc.

While the examples are described with reference to "C" type Bourdon tubes, the invention is also applicable to pressure responsive tubes of other configuration such as helical tubes and twist tubes. A direction of a component of motion or displacement caused by expansion and contraction of the tube is selected along a chord of the helix or twist for implementing relative displacement of the magnet element and HET according to the invention.

The separate mounting of the magnet element and HET according to this example embodiment of the invention may also be applied to a ring force gauge in which the parameter responsive structure is in the configuration of a ring or annulus for measuring weight, mass and force and the selected direction of a component of motion or displacement is a diameter of the ring or annulus.

In each of the foregoing example embodiments, the invention also provides an HET enhancer for enhancing the linearity and sensitivity of response of the HET voltage output to displacement of the magnet element. The HET enhancer is generally a magnet element receiver of magnetically permeable material such as, for example, a sleeve or tubular section mounted adjacent to the Hall effect transducer.

The invention also provides a new self-contained Hall effect transducer assembly incorporating a Hall effect sensor, a magnet element and a support of nonmagnetic material on which the Hall effect sensor is mounted, all in one unit. The new transducer assembly also incorporates a novel spring mounting coupled to the support for mounting the magnet element for displacement relative to the Hall effect transducer by pushing action. In a preferred example embodiment, the spring mounting comprises a magnet element receiver of magnetically permeable material mounted on the support in spaced relationship relative to the Hall sensor. The magnet element receiver is constructed and arranged for receiving and suspending the magnet element in its own magnetic field in spaced juxtaposition relative to the Hall effect sensor. The magnet element is therefore seated and suspended in the magnet element receiver providing its own "magnetic spring" restoring action, for translation back and forth relative to the Hall effect sensor in response to pushing action imparted by the expansion and contraction of an abutting parameter responsive structure along a selected direction of a component of motion and displacement.

According to the preferred embodiment, the magnet receiver comprises a hollow tube, sleeve, cylinder, or annulus of magnetically permeable material. The magnet element is formed with a cross-sectional configuration complementary to the tube or annulus for sliding motion back and forth within the tube or annulus. The wall of the tube provides a magnetic circuit for the magnetic field lines and magnetic flux of the magnet element. Furthermore the magnet element is magnetized along an axis of magnetization for substantial self-centering of the magnet element seated and suspended within the tube or sleeve providing the "magnetic spring" restoring action.

A feature and advantage of the magnet element receiver of magnetically permeable material according to the invention is that the magnet element receiver provides a magnetic circuit in association with the magnet element and Hall sensor or Hall effect transducer which enhances the sensitivity and response of the HET to relative motion of the magnet element. According to the invention, the magnet element receiver or sleeve enhances the change or difference in the magnetic field in the locus of the Hall effect transducer upon displacement of the magnet element for improved response and sensitivity of the HET. The HET enhancer also extends and enhances the linear range of the HET. The invention also contemplates providing a magnet element receiver sleeve or tubular section which is itself magnetized, for example, with an axis of magnetization parallel to the axis of magnetization of the magnet and in the same or opposite direction. The magnetized or permanent magnet HET enhancer such as a sleeve or tubular section provides greater "magnetic spring" action and further enhances the sensitivity of response and linearity of HET voltage output.

The magnet element is formed with a pusher or push bearing extension of nonmagnetic material secured to the side of the magnet element. The pusher projects beyond the end of the receiver tube or sleeve for abutting against a parameter responsive structure for application of pushing action to and displacement of the magnet element upon expansion and contraction of the parameter responsive structure. The length of the pusher may be adjustable for setting the initial spacing between the magnet element and Hall effect transducer or Hall sensor. For example, the pusher or push extension may be provided with an extending screw to set the initial or starting displacement of the magnet element in the linear response region of the HET.

According to another feature of the invention, the magnet element receiver, sleeve, or magnetic circuit itself is adjustable in position relative to the HET. An advantage of this arrangement is that adjusting the spacing of the magnet element receiver or magnetic circuit may be used to adjust and shift the response curve of the HET to a desired slope, and a desired range of displacement of the magnet element.

Another feature and advantage of the Hall effect transducer assembly according to the invention is that a single piece assembly is provided for both the Hall effect transducer and the magnet element while permitting variable spacing and displacement between the magnet element and Hall effect transducer by pushing action on the magnet element. The various elements of the HET assembly may be formed together, for example, by injection molding for single piece construction. The single piece Hall effect transducer assembly is therefore particularly suited for retrofitting relative to parameter responsive structures between the parameter structure and a reference mounting or reference locus with, for example, the parameter responsive structure in abutting relationship with the extending pusher formed on the magnet element.

For example, according to the invention, the self-contained Hall effect transducer assembly or unit is retrofitted in a conventional mechanical analog pressure gauge between the housing and Bourdon tube. By way of another example, the self-contained Hall effect transducer assembly or unit may be mounted within a ring force gauge or testing ring along a diameter of the ring between a reference locus and the opposite side.

Generally the invention provides a variety of new parameter sensors and monitors using Hall effect transducer assemblies and arrangements relative to parameter responsive structures for application in monitoring weather conditions and ambient parameters and for use in a variety of condition sensing instrumentation including motion, displacement, and position sensitive transducers for measuring pressure, mass, weight, force, altitude, etc. Other objects features and advantages of the invention are apparent in the following specification and accompanying claims.

BRIEF DESCRIPTION OF THE DRAWINGS

FIG. 1 is a diagrammatic side view with the HET enhancer shown in cross section and FIG. 2 is a diagrammatic plan view of a barometer or altimeter according to the invention while FIG. 1A is a fragmentary end view of an alternative parallel support of the barometer or altimeter housing.

FIG. 3 is a diagrammatic side view with the HET enhancer shown in cross section of an alternative configuration for the barometer or altimeter of FIGS. 1 and 2.

FIG. 6 is a diagrammatic plan view from behind of a typical prior art mechanical analog pressure gauge with the back cover removed showing the Bourdon tube.

FIG. 7 is a diagrammatic plan view from behind of the pressure gauge of FIG. 6 retrofitted with a Hall effect transducer retrofitting kit for electrical signal output according to the invention and showing the HET enhancer in cross section.

FIG. 7A is a plan view of the back cover of the retrofitted pressure gauge of FIG. 7 showing the modification of the back cover according to the present invention for access to the Hall effect transducer output terminals and socket.

FIG. 7B is a fragmentary diagrammatic view of the Bourdon tube showing an alternate arrangement for bonding the magnet element to the Bourdon tube.

FIG. 11 is an exploded side view of the magnet element and magnet element receiver from the self-contained Hall effect transducer assembly of the present invention while FIG. 11A is an end view of the magnet element receiver showing an example tubular cylindrical configuration.

FIG. 12 is a side view of the magnet element and magnet element receiver portion of the self-contained Hall effect transducer assembly showing the magnet element seated and substantially self-centering within the magnet element receiver.

FIG. 13 is a side view of the magnet element receiver and nonmagnetic support from the self-contained Hall effect transducer assembly while FIG. 13A is a side view of the Hall effect transducer mounting.

FIG. 14 is a side view, FIG. 14A a front plan view and FIG. 14B a rear plan view showing a fragmentary portion or sub-assembly of the self-contained Hall effect transducer assembly namely the Hall effect transducer and magnet element receiver mounted on the support of nonmagnetic material.

FIG. 15 is a fragmentary exploded view showing the magnet element ready to be seated in the magnet element receiver of the subassembly of FIG. 14 while FIG. 16 is a side view of the subassembly with the magnet element seated and self-centering in the magnet element receiver.

FIG. 19 is an exploded diagrammatic side view of a pressure gauge of the type illustrated in FIGS. 6 and 7 being retrofitted with a self-contained Hall effect transducer assembly of the type shown in FIG. 17.

FIG. 20 is a exploded view of a magnet element receiver or sleeve with external threading and a support of nonmagnetic material with threaded recess for incorporation in a self-contained Hall effect transducer assembly of the type illustrated in FIG. 17 for variable positioning of the magnet element receiver or sleeve relative to the Hall effect transducer.

FIG. 20A is a diagrammatic side view of the complementary threaded magnet element receiver or sleeve in position in the support.

FIG. 21 is a diagrammatic side view of a magnet element and pusher fitted with an extending screw for varying the extension of the pusher abutting against a parameter responsive structure for varying the initial spacing between the magnet element and Hall effect transducer.

FIG. 21A is an exploded diagrammatic side view of the magnet element illustrated in FIG. 21.

FIG. 22 is a diagrammatic side view of a magnet element according to the invention in which the magnet element is fitted with a pointed tip to enhance magnetic field effects of displacement of the magnet element on the HET output.

DESCRIPTION OF PREFERRED EXAMPLE EMBODIMENTS AND BEST MODE OF THE INVENTION

Figure 4:
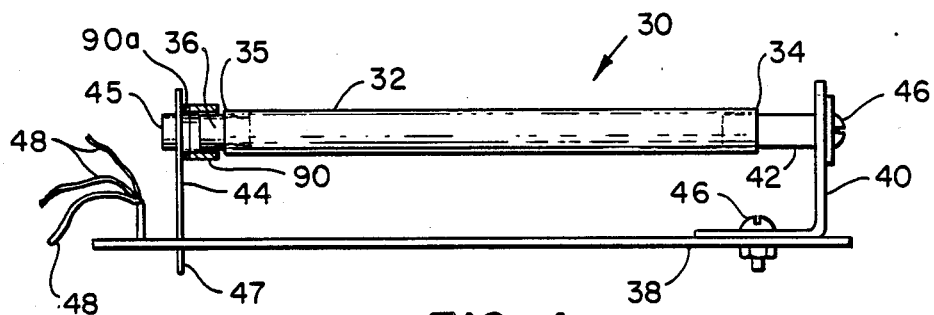
FIG. 4 is a diagrammatic side view and FIG. 5 is a diagrammatic plan view of a hygrometer according to the present invention with the HET enhancer shown in cross section.

A barometer or altimeter 10 according to the present invention is illustrated in FIGS. 1 and 2. The parameter responsive structure of the barometer or altimeter is an evacuated bellows or capsule 12 secured at its center axis 15 on one side 14 to the parallel support 15 which is mounted on and spaced from the base 16 in substantially parallel relationship by the threaded spacing screws or bolts 17 and 18. The parallel support 15 may be formed in the configuration of a "U" shaped channel 15a for added strength and rigidity as shown in FIG. 1A.

According to the invention a magnet element 20 is secured or bonded at the center axis 15 to the bellows or capsule 12 on the other side 22 from the parallel support 15. A linear Hall effect transducer or Hall sensor 24 is secured to the base 16 in alignment with the center axis 15 of the bellows or capsule 12 in spaced juxtaposition relative to the magnet element 20 for variable spacing between the magnet element 20 and Hall sensor 24 in response to changes in ambient pressure or altitude which cause expansion and contraction of the bellows 12 in a component of motion and displacement along it center axis 15. A variable output signal appears on the output terminals or lines 25 of the Hall sensor 24 corresponding to variations in the ambient pressure.

To enhance the operation of Hall effect transducer 24 an HET enhancer 90 is incorporated in the barometer/altimeter in association with the Hall effect transducer element 24 and magnet element 20. The HET enhancer improves and extends the linear range of HET voltage output and increases the sensitivity of HET voltage output response to magnet element displacement. The HET enhancer is a magnet element receiver in this example in the configuration of a sleeve or tubular section 90 of magnetically permeable material secured adjacent to the HET 24 on a spacer ring 90a of nonmagnetic, nonpermeable material. The HET enhancer sleeve 90 is therefore secured adjacent to HET 24 with the spacing afforded by nonmagnetic ring 90a to accommodate movement or displacement of the magnetic element 20 toward and away from HET 24 within the HET enhancer sleeve 90.

According to the invention the base 16, parallel support 15 and spacing screws or bolts 17 and 18 constitute a housing or reference mounting for the ambient pressure sensor or monitor 10 of the invention. In this example the Hall effect sensor 24 is mounted or secured to the reference mounting or housing portion at the base 16 while the magnet element 20 is secured to the parameter responsive structure, in this case the bellows 12, for movement relative to the Hall sensor 24 upon expansion and contraction of the bellows 12 which provides the component of motion and displacement along its center axis 15. The initial spacing between the magnet element 20 and Hall sensor 24 may be adjusted by variable spacing of the parallel support 15 from base 16. This is accomplished by adjustment of the screw 18 for compressing or permitting expansion of the spacing spring 26 mounted coaxially around the spacing screw 18 between the parallel support 15 and base 16. At the other end fixed spacing is maintained between the parallel support 15 and base 16 by means for example of a rigid cylinder 28 positioned coaxially around the spacing screw 17.

An alternative barometer or altimeter arrangement 11 is illustrated in FIG. 3. According to this embodiment the elements of the barometer or altimeter 11 remain the same as the barometer or altimeter 10 of FIGS. 1 and 2 with elements designated by the same reference numerals except that the positioning of the Hall sensor 24 and magnet element 20 along the center axis 15 of the bellows 12 is reversed. That is the Hall effect transducer 24 along with HET enhancer sleeve 90 and spacer ring 90a are secured or bonded along the center axis to the side 22 of bellows 12 while the magnet element 20 is secured or bonded along the center axis 15 to the base 16. In both the examples of FIGS. 1-3, the magnet element 20 is typically selected in the configuration for example of a cylinder magnetized so that the magnetic axis coincides with the center axis of the cylinder with magnetic field lines therefore extending at the end of the cylinder in the locus of the Hall sensor 24. The Hall sensor 24 is typically a linear Hall sensor such as for example the Honeywell Microswitch Division Serial No. 92SS12-2 Micro 401 (Trademark) linear Hall sensor or other Linear Output Hall Effect Transducers (LOHET) (Trademark) of Honeywell.

In the illustrations of FIGS. 1-3 the unnumbered components represent for example components mounted on a circuit board which constitutes the base 16 and the components provide desired processing and digital readout from the electrical output signals of the Hall sensor. Such components may include for example a microprocessor for processing the signals and in the case of an altimeter may provide the readout for example in feet or meters etc.

Furthermore in the examples of FIGS. 1-3 where the magnet element 20 is bonded or secured directly to the bellows or capsule 12 the bellows is made of nonmagnetic material such as for example copper or brass. In the example of FIG. 3 where the magnet element 20 is secured to the base and the Hall sensor to the bellows, the bellows can be made of any suitable material including magnetically permeable material such as steel.

Figure 5:
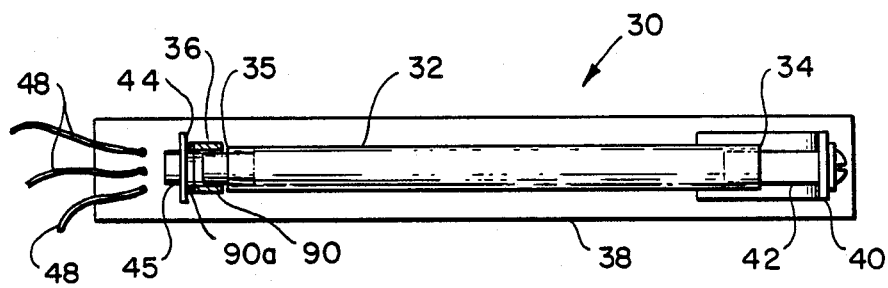

A hygrometer 30 according to the invention is illustrated in FIGS. 4 and 5. The parameter responsive structure of the hygrometer 10 is an elongate tube or hollow cylinder 32 of a rigid hydroscopic plastic material, in this example cellulose acetate. Any other suitable hydroscopic material which imparts substantial rigidity to the tube may also be used. The tube or cylinder 32 responds to variations in ambient humidity or moisture by expansion and contraction of the elongate dimension of the tube causing a component of motion and displacement along the elongate axis of the tube. A tube 32 is mounted at one end 34 to the reference mounting or housing for supporting one end 34 in fixed position for expansion and contraction of the free end 35 in response to variation in humidity. The magnet element 36 of cylindrical configuration is seated inside the free end 35 of tube 32 and is therefore displaced by the expansion and contraction of tube 32.

The reference mounting or housing is provided by a base 38 and a first projecting support 40 from which extends a support dowel or cylinder 42 dimensioned to fit within the fixed end 34 of hygrometer tube 32 by slip fit rather than force fit. The fixed end 34 of hygrometer tube 32 is glued in place over the support dowel or cylinder 42.

A second projecting support 44 is also connected to the base 38 spaced from the free end 35 of the hygrometer tube 32 and the magnet element 36. The magnet element 36 is glued in place in the free end 35 of hygrometer tube 32 and therefore lies along the elongate axis of hygrometer tube 32. The Hall effect transducer or sensor 45 is mounted on the second projecting support 44 also in alignment with the elongate axis of the hygrometer tube 32 in spaced juxtaposition with respect to the magnet element 36 for relative motion and displacement between the magnet element 36 and HET 45 upon expansion and contraction of the hygrometer tube 32 in response to variations in humidity.

To enhance the operation of HET 45 an HET enhancer according to the invention is also incorporated in the hygrometer in association with the Hall effect transducer 45 and magnet element 36. The HET enhancer is similarly a magnet element receiver in the configuration of sleeve or tubular section 90 of magnetically permeable material secured adjacent to HET 45 at the HET mounting board or second projecting support 44 on a spacer ring 90a of nonmagnetic, nonpermeable material. As described above, the spacing afforded by nonmagnetic ring 90a accommodates movement or displacement of magnet element 36 toward and away from HET 45 within HET enhancer sleeve 90. The inner diameter of sleeve 90 is selected to provide clearance for a smooth slip-fit of magnet element 36 within the sleeve 90.

The initial spacing between the magnet element 36 and HET 45 may be set by adjusting the relative position and spacing of the first projecting support 40 using the threaded bolt 46 which secures the first projecting support 40 to the base 38. The second projecting support 44 may comprise a printed circuit board on which is provided an op amp for amplifying the output from HET 45 on the HET leads 48 by, for example, a factor of 10. The Honeywell Hall effect transducer model referred to above provides such an HET and op amp in combination on a circuit board with output pins 47 which in the example of FIGS. 4 and 5 are electrically coupled for example by printed circuit lines to the amplified HET output lines 48 and by the magnetic circuit effect provided by the HET enhancer sleeve 90. The Hall effect transducers of Sprague Electric Co. are also suitable for use in the present invention.

For the magnet element 36 an Alnico VIII (Trademark) or Alnico V (Trademark) permanent magnet may be used, for example, in the configuration of a cylinder. The preferred magnetization is with the axial polarity of the north-south axis of magnetization coinciding with the cylinder axis so that the magnetic flux or magnetic lines of force at the end of the cylinder magnet extend into the locus of the Hall element. The output of the Hall effect transducer is proportional to the magnetic flux from the permanent magnet which varies according to the displacement of the magnet element 36 relative to the Hall element. This variation in flux or magnetic field strength in gauss is enhanced by the orientation of the axis of magnetization to coincide with the axis of the cylinder and by the magnetic circuit effect provided by the HET enhancer sleeve 90.

While the hygrometer tube 32 was described with reference to the example embodiment using a tube of cellulose acetate other rigid hydroscopic plastics may be used such as acetate butyrate and acrylic plastics and nylons generally. The length of hygrometer tube may be for example in the range of 3 to 3.5 inches (7.6 to 8.9 cm) while the diameter of the tube may be, for example, in the range of ¼ inch (0.6 cm). The thickness or gauge of the plastic is a factor in the sensitivity of response of the tube by expansion and contraction. The thinner gauge provides greater sensitivity of response to ambient humidity and moisture by expansion and contraction. However, sufficient rigidity and strength is required to maintain the linearity of the hydrometer tube.

An application of the present invention for transforming mechanical analog pressure gauges to electrical output transducers suitable for, for example, digital readout is illustrated in FIGS. 6-10. A conventional pressure gauge 50 with the back exposed is illustrated in FIG. 6. The parameter responsive structure of pressure gauge 50 is a Bourdon tube 52 in the configuration of an arc fixed at one end 54 to the pressure gauge housing for expansion and contraction of the free end 55 of Bourdon tube 52 in response to variation of pressure, for example of a gas applied at the inlet 56. Expansion and contraction of the free end 55 takes place along an imaginary chord of the arc of Bourdon tube 52 and the motion of free end 55 is translated by conventional or standard mechanical linkages 58 to rotary motion of a dial pointer, not visible, on the front of the face of the dial 60 of pressure gauge 50. Thus, the conventional Bourdon tube pressure gauge provides a mechanical analog readout only of pressure applied at the inlet 56.

The reference mounting or housing for the pressure gauge 50 is provided by the base 62 through which passes the inlet opening 56 which communicates with the inside of Bourdon tube 52. The dial 60 is mounted in fixed relationship to the base 62. The reference mounting base 62 also provides the reference locus with respect to which relative motion of the free end 55 of Bourdon tube 52 introduces mechanical motion to the linkages 58.

According to the present invention, the Bourdon tube 52 is viewed as another parameter responsive structure for introduction and application of the Hall effect transducer arrangement provided by the invention. According to the embodiment of the invention illustrated in FIGS. 6–10 as hereafter described, a magnet element is secured to the arc of the Bourdon tube 52 along any selected chord of the arc selected to be the direction of a component of motion and displacement caused by expansion and contraction, and the Hall effect transducer is secured relative to the reference mounting or housing of the gauge and the fixed end of the arc provided by the base 62.

Figure 8:
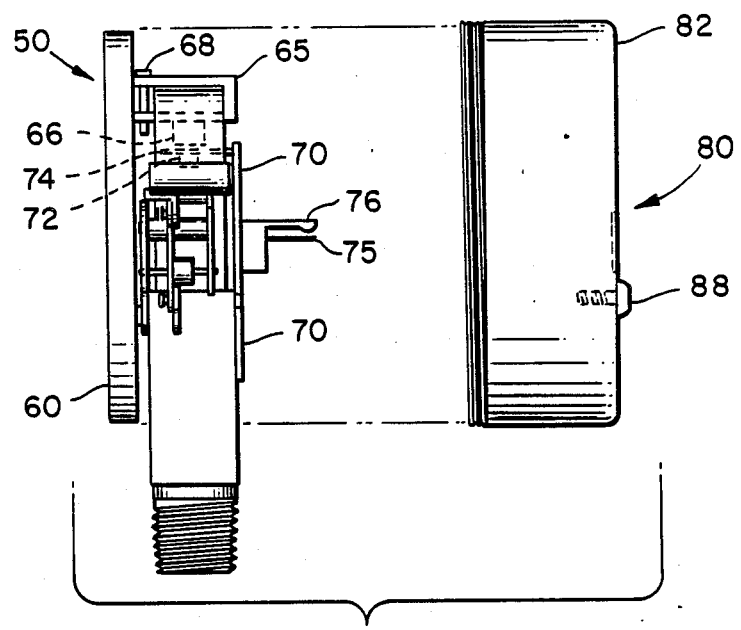
FIG. 8 is a diagrammatic side view of the retrofitted pressure gauge of FIG. 7 with the back cover removed and with the HET enhancer not shown for clarity and simplification.

Referring to FIGS. 7 and 8, a retrofitting kit is shown installed on the pressure gauge 50 which converts or transforms the conventional mechanical analog pressure gauge for electrical signal output suitable for processing, for example for digital readout. The retrofitting kit includes a first "U" shaped bracket 65 with the magnet element 66 secured to the bottom of the bracket. The bracket 65 is shown in detail in FIG. 10 and includes on one side a small mounting screw 68 for engaging and coupling the bracket 65 over the Bourdon tube 52 at a selected location along the arc of the Bourdon tube which is intersected by the chord of the arc selected to be the preferred direction of motion and displacement from expansion and contraction of the pressure tube. The selected chord and direction of motion and displacement can be selected at any location along the arc of the Bourdon tube and in the examples of FIGS. 7 and 8 is selected at the top of the arc where the greatest space is available for retrofitting elements of the transducer assembly kit as hereafter described. Furthermore, the direction of a component of motion and displacement might be selected to lie along the elements of the mechanical linkage 58 using the motion of elements of the mechanical linkage for operating the transducer assembly of the present invention.

Figure 9A:
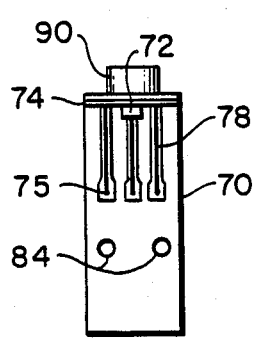
FIG. 9 is a side view, FIG. 9A a front plan view, and FIG. 9B a rear plan view of the Hall effect transducer mounting bracket of the Hall effect transducer retrofitting kit of the present invention.
FIG. 9C is a diagrammatic side view of the HET mounting bracket and the HET enhancer magnet element receiving sleeve showing a fragmentary portion of the Bourdon tube and juxtaposed magnet element.
Figure 9:
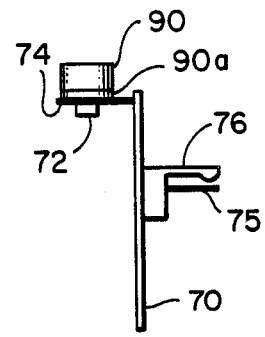
Figure 9B:
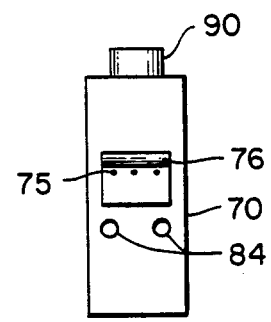

A second bracket 70 also shown in detail in FIGS. 9, 9A, and 9B is constructed and arranged for coupling the Hall effect transducer 72 in fixed position relative to the pressure gauge housing base 62 and the fixed end 54 of the Bourdon tube 52. The bracket 70 supports the Hall effect transducer circuit board 74 on which the Hall element of Hall effect transducer 72 is mounted and may also include an op amp to amplify the HET output. The leads from HET 72 are carried along the base of bracket 70 which may be, for example, a printed circuit board, through printed circuit lines 78 to the pins 75 of the plug or socket 76 providing access, for example, to appropriate electronics for digital readout.

To enhance the operation of HET 72, the HET enhancer of the present invention is also incorporated in the second bracket 70 in association with HET 72 and magnet element 66. The HET enhancer sleeve 90 is constructed and mounted in the manner heretofore described adjacent to the HET 72 on the nonmagnetic spacer ring 90a.

When the second bracket 70 is mounted in the pressure gauge 50 as shown in FIGS. 7 and 8 the plug or socket 76 is accessible through the back of the gauge through an opening 80 cut or drilled through the back of cover 82 as shown in FIGS. 7A and 8. When the gauge is assembled and operating in the standard manner as a mechanical analog device, the electrical leads and electrical signal output from the Hall effect transducer 72 are also accessible through the socket or plug 76 for processing the electrical signals to provide, for example, concurrent digital readout.

The second bracket or Hall effect transducer mounting bracket 70 is retrofitted in the pressure gauge 50 by inserting the bracket as shown in FIG. 7 with the Hall effect transducer 72 and HET enhancer 90 projecting into and mounted within the space designated by the reference numeral 85 in the illustration of the prior art pressure gauge 50 of FIG. 6. The locus or space 85 within the arc of the Bourdon tube 52 is found above the mechanical linkages 58 at the top of the arc providing the most suitable space for accommodating both the Hall effect transducer 72 with HET enhancer 90, and permanent magnet element 66 in spaced juxtaposition for displacement relative to each other upon expansion and contraction of the Bourdon tube 52. The Hall effect sensor 72 is mounted and maintained in fixed position relative to the reference mounting and housing of pressure gauge 50 by providing the base of the bracket 70 with the two holes 84 which coincide with the housing holes 86 formed in the base 62 of the pressure gauge reference mounting or housing and which accommodate the screws 88 which retain the back cover 82 on the pressure gauge. Thus, in the retrofitted position, the Hall effect transducer bracket or second bracket 70 is secured or bolted between the base 62 of the pressure gauge housing and the back cover 82 by the screws 88. In this position the socket or plug 76 which contains the three lead pins 78 carrying the signals for the Hall effect transducer is accessible through the opening 80 formed in the back of the cover 82. In the illustration of FIG. 8, the HET enhancer is not shown for clarity of presentation of other elements.

Because the convenient locus or space 85 is available at the top of the arc of the Bourdon tube 52 of the conventional prior art pressure gauge 50 of FIG. 6, the selected direction of a component of motion or displacement caused by expansion and contraction in the examples of FIGS. 7 and 8 is a chord of the arc which extends from the base 62 in which the fixed end 54 of the Bourdon tube 52 is anchored to substantially the top of the arc of the Bourdon tube. Such a chord also coincides with the vertical diameter of an imaginary circle formed by completing the arc of the Bourdon tube. Upon application or variation of pressure at the inlet 56 of the base 62 which inlet communicates with the inside of Bourdon tube 52, the Bourdon tube expands in effect by "unrolling" producing a component of motion along the selected directional axis or vertical chord of the arc resulting in displacement of the permanent magnet 66 relative to the Hall element of the Hall effect transducer 72 thereby changing the magnetic field strength or magnetic flux at the locus of the Hall effect transducer whose output voltage is proportional to the magnetic flux.

It is apparent, however, in contemplation of the present invention that any component of motion along any chord of the arc can be selected for the directional axis for detection of expansion and contraction. It is also apparent that the displacement imparted to the mechanical linkage elements 58 may also be used for providing relative displacement between the permanent magnet element and HET of the transducer assembly of the present invention to provide an electrical signal output for either analog or digital processing. Furthermore, the invention is applicable to pressure responsive tubes of any configuration in addition to "C" tubes including helical and twist tubes, and a direction of a component of motion and displacement caused by expansion and contraction of a pressure tube of any geometry is selected for placement of magnet element and HET element.

Furthermore, according to these embodiments of the invention in which the permanent magnet element and Hall effect transducer are separately mounted, one to the Bourdon tube parameter responsive structure or other pressure tube and the other to the reference mounting or pressure gauge housing, the permanent magnet element may be secured, mounted, or bonded to the selected location along the arc of the Bourdon tube or other pressure tube in a number of ways. As described with reference to FIGS. 7 and 8, a "U" shaped bracket 65 to which the permanent magnet element 66 is secured may be used. Alternately, as shown in FIG. 7B, the permanent magnet element 66 may be bonded directly to the Bourdon tube or other pressure tube of whatever geometry by, for example, adhesive bonding or glue. A feature and advantage of this arrangement is that it minimizes the weight, tension or distortion applied to the Bourdon tube or pressure tube of other geometry thereby minimizing any distortion in the mechanical analog representation of the pressure and pressure variation applied at the inlet 56.

Figure 9C:
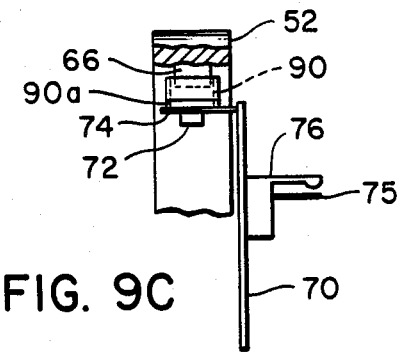

This variation of the HET mounting bracket or second bracket 70 for enhancing the sensitivity and response of the Hall effect transducer is further illustrated in FIG. 9C in which corresponding elements are designated by the same reference numerals. An HET mounting bracket of the type illustrated in FIG. 7 is there shown with the magnet element 66 positioned for displacement within HET enhancer sleeve, section of tube or hollow cylinder 90 of magnetically permeable material. The sleeve 90 functions as a magnet element receiver for accommodating displacement of permanent magnet element 66. As illustrated in FIG. 7B, the magnet element 66 is bonded to the arc of Bourdon tube 52. HET enhancer sleeve 90 is mounted on the HET board 74 on nonmagnetic spacing sleeve 90a concentrically about the HET 72.

Figure 23:
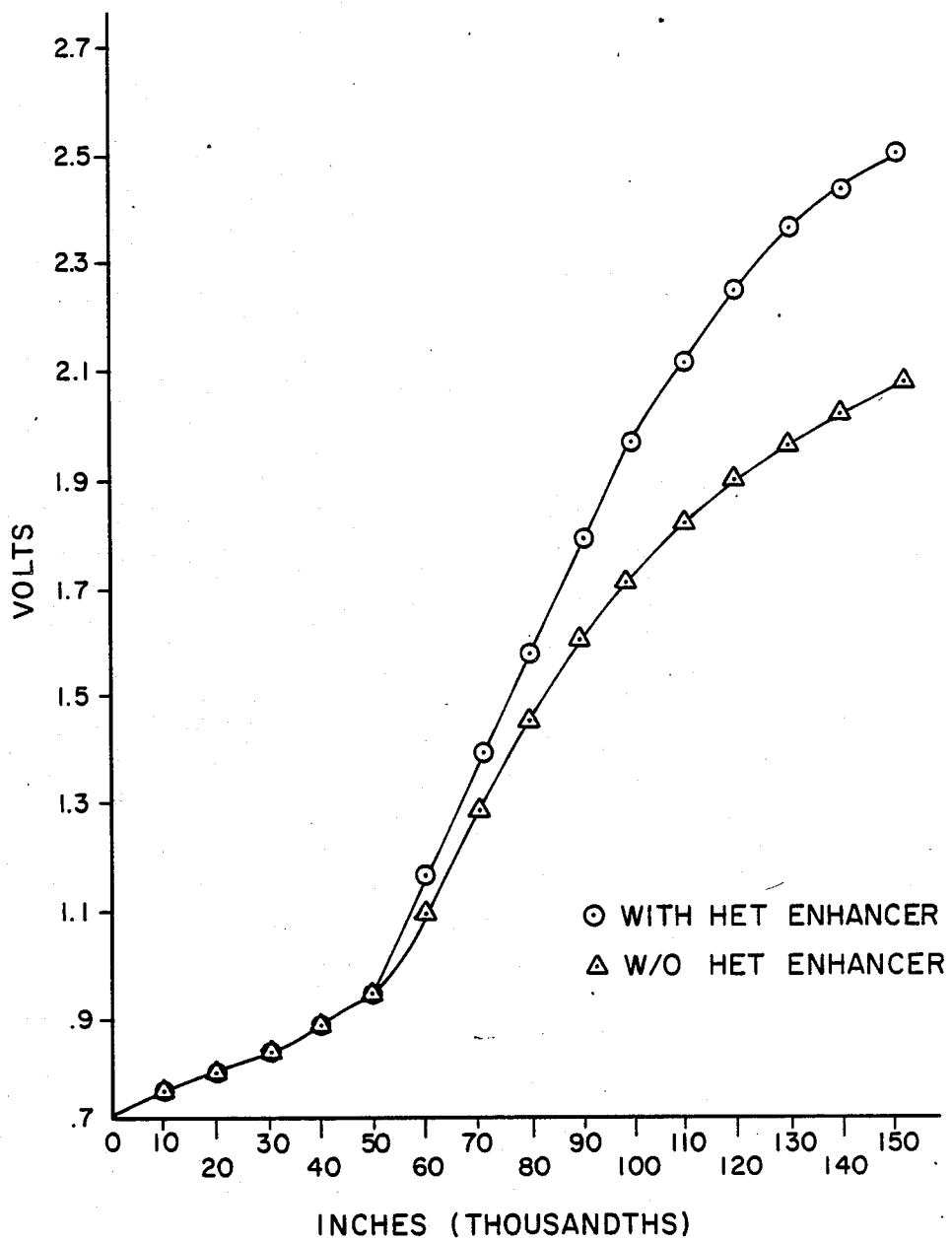
FIG. 23 is a graph of HET voltage output in volts versus magnet element displacement in thousandths of an inch for a prior art unenhanced HET transducer and for an HET transducer assembly according to the invention incorporating the novel HET enhancer, and showing the dramatic enhancement of linearity and sensitivity of response afforded by the invention.

A feature and advantage of the magnet element receiver sleeve 90 is that the sleeve 90 provides an effective magnetic circuit in association with the permanent magnet element 66 and HET 72 which enhances the sensitivity of response of the HET 72 resulting from displacement of the magnet element 66 relative to the sleeve 90 and HET 72 in turn caused by expansion and contraction of the Bourdon tube 52. It has been found in addition that the sleeve 90 of permeable material furthermore enhances the linearity of the response of HET 72 and extends the linear range of response to displacement of the permanent magnet element 66. As shown in the graph of FIG. 23, the magnet receiver sleeve or magnetic circuit 90 changes or increases the slope of response measured as voltage versus displacement thereby enhancing the sensitivity of the transducer to displacement of the magnet. It also enhances and extends the linearity of the HET response measured as volts output versus displacement.

The principles, features and mode of assembly of a self-contained single piece Hall effect transducer assembly, according to the present invention, are illustrated with reference to FIGS. 11-17. According to this aspect of the invention and as first shown in FIGS. 11 and 11A, a magnet element receiver or sleeve 100 also referred to herein as the HET enhancer 100 is provided in the configuration of a section of a tube or hollow cylinder. A cylindrical permanent magnet element 102 is sized to slide freely within the receiver 100 in a slip-fit. Thus, the outer diameter of magnet element 102 and the inner diameter of the magnet receiver sleeve 100 are selected and formed for free sliding motion of the permanent magnet element 102 within the sleeve 100 for smooth action and without excessive play. The axis of magnetization of the permanent magnet 102, that is the north-south pole axis is oriented to coincide with the axis of the cylinder so that the permanent magnet seats itself within the magnet element receiver or sleeve 100 suspended by its own magnetic field. The magnet element 102 is substantially self-centering or self-spring biasing within the sleeve 100 by the action of the magnetic lines of force, magnetic flux or magnetic field lines emanating along the axis of the cylinder, interacting with the magnetic circuit afforded by the walls of permeable material of the hollow cylinder or sleeve 100.

In order to provide the self-contained Hall effect transducer assembly, a sub-assembly may be first fabricated by, for example, incorporating the magnet element receiver or sleeve 100 within a support 105 of nonmagnetic material as illustrated in FIG. 13. In this example the support 105 comprises a block 105 of nonmagnetic material such as a block of nylon or other synthetic material formed with a recess 104 for receiving the sleeve 100. According to one example embodiment, the recess 104 and sleeve 100 are sized for friction fitting of the sleeve within the bore. The sub-assembly also includes a Hall effect transducer 106, for example, a Honeywell model or Sprague model of the type referenced above mounted on its own HET mounting board 108 which may include, for example, a printed circuit and op amp for amplifying the output of the HET element with output leads provided by prongs 110. The HET 106 and mounting board 108 are secured to the support or block 105 by, for example, adhesive bonding to provide the sub-assembly 115 illustrated in FIGS. 14, 14A, and 14B. As shown in FIG. 14, the magnet receiver or sleeve 100 and the recess 104 of support block 105 may be dimensioned for tight friction fit or for adjustable movement of the sleeve 100 within the recess 104 to vary the HET enhancing effects of the magnet receiver of sleeve 100 as hereafter described. In the latter event a set screw 112 shown in dotted outline may be provided to secure the desired position of the sleeve 100 relative to the HET 106.

Upon completion of the sub-assembly 115 illustrated in FIG. 14, the permanent magnet element 102 may be positioned for placement within the magnet element receiver 100, for suspension within and self-centering or other self-spring biasing within the magnet element receiver 100 by its own magnetic field cooperating with the magnetic circuit provided by the permeable walls of the receiver 100 as shown in FIGS. 15 and 16.

As shown in FIGS. 11, 12, 15 and 16, the magnet element 102 is formed with a pusher or push bearing element 116 of nonmagnetic material which projects beyond the end of the magnet element receiver or HET enhancer 100 when the permanent magnet element 102 is seated and suspended within the receiver 100. The pusher or push bearing element 116 is constructed and arranged for bearing against a parameter responsive structure subject to expansion and contraction in response to a specified parameter along a selected direction of a component of motion and displacement for bearing the push imparted by such expansion and contraction for displacement of the magnet element 102 relative to HET 106. A feature and advantage of this arrangement is that the magnetic field of the permanent magnet element 102 provides its own self-biasing spring action for restoring the permanent magnet 102 toward an original position within the sleeve 100 as pushing action is relieved or released. As a result, the position of the magnet element 102 and its displacement relative to HET 106 faithfully follows the expansion and contraction of a parameter responsive structure along the direction of the selected component of motion and displacement caused by variations in a parameter to be measured. This variation in displacement provides electrical signal outputs on the pins or lines 110 proportional to the variations in the parameter to be measured.

Figure 17A:
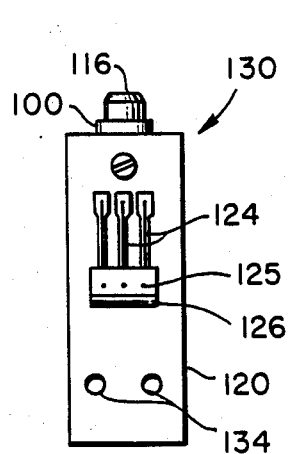
FIG. 17 is a side view, FIG. 17A a rear plan view and FIG. 17B a front plan view of the completed self-contained Hall effect transducer assembly all in one unit, for application for example for retrofitting in the pressure gauges of FIGS. 6 and 7 and the ring force gauge of FIG. 18.
Figure 17:
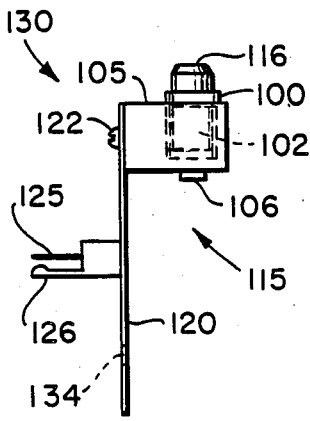
Figure 17B:
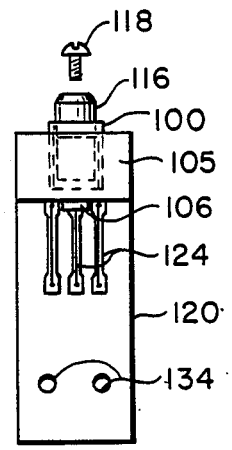

A further single unit self-contained Hall effect transducer assembly suitable for retrofitting a number of existing parameter sensors and monitors, gauges and instruments is illustrated in FIGS. 17, 17A, and 17B. In this preferred example embodiment the sub-assembly 115 composed of the block support 105, Hall effect transducer 106, magnet receiver or sleeve 100, permanent magnet element 102 and pusher or push bearing element 116 is secured to a mounting board 120 by means of threaded screws or bolts 122. In the full assembly embodiment of FIGS. 17, 17A, and 17B the pins 110 of the original HET mounting board 108 have been removed and the HET leads are bonded as for example by soldering to printed circuit leads 124 which are in turn electrically coupled to the pins 125 of an external plug or socket 126. As such, the full Hall effect transducer assembly 130 bears some resemblance to the HET mounting bracket 70 of FIGS. 9, 9A, and 9B. However, the full Hall effect transducer assembly 130 is a self-contained unit mounting both the HET 106 and permanent magnet element 102 in spaced juxtaposition relative to each other for relative displacement by pushing action from the expansion and contraction of a parameter responsive structure bearing against the pusher or push bearing element 116.

Figure 18:
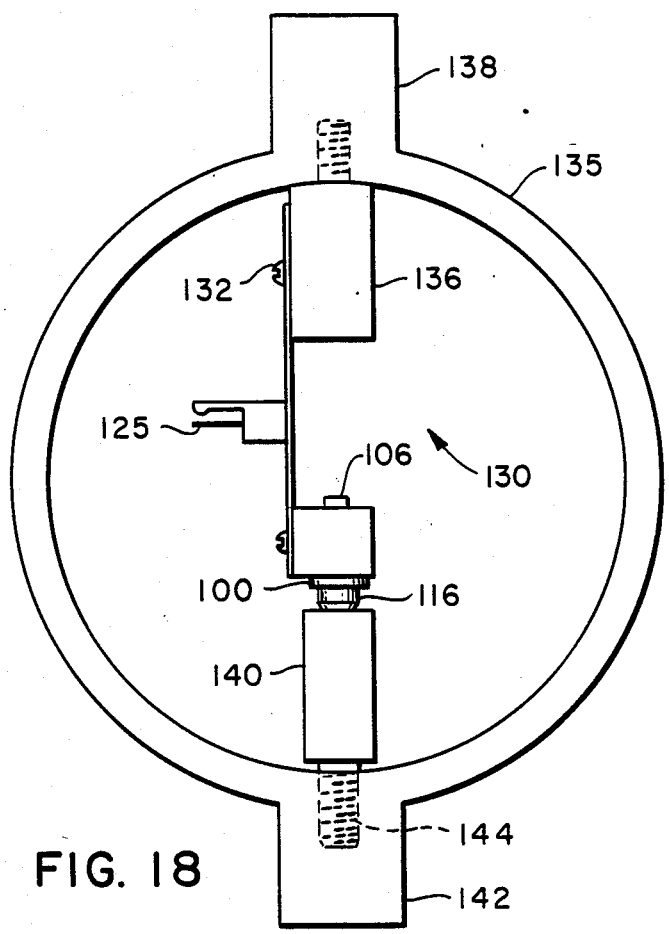
FIG. 18 is a diagrammatic plan view of a ring force gauge retrofitted with the self-contained unitary Hall effect transducer assembly of FIG. 17.

One application of the self-contained HET assembly 130 is illustrated in FIG. 18 where the assembly 130 is retrofitted in a ring force gauge or proving ring 135. In this application and embodiment of the invention the self-contained HET assembly 130 is fixed to a projecting support 136 by means of screws 132 passing through holes 134 in the mounting board of HET assembly 130 into the column support 136 which is in turn plug fitted into the upper stem 138 of proving ring 135. In this position the pusher or push bearing element 116 of the HET assembly 130 bears against a push column 140 threaded into the lower stem 142 of the proving ring 135. Force weight or mass applied to the stems of the ring force gauge 135 produces displacement of the magnet element, not visible, relative to the HET 106 and within HET enhancer sleeve 100 providing electrical signal output on the lead pins 125 proportional to the displacement and in turn proportional to the force weight or mass applied to the proving ring. The electrical signal leads on pins 125 may be coupled for analog or digital processing, for example, for providing digital readout.

The initial starting position of the magnet element relative to the Hall effect transducer may be set or adjusted by adjusting the height of pusher column 140 by turning the pusher column 140 in the threaded recess 144 of the lower stem 142 of the proving ring 135. By this expedient the initial displacement position of the permanent magnet element 102 can be set, for example, at the beginning of the linear response range of the Hall effect transducer so that the output remains in the linear range. An alternative method and arrangement for adjusting the initial displacement position of the permanent magnet 102 relative to HET 106 is shown in dotted outline in FIG. 17B where a threaded screw 118 is provided in the end of the pusher or push bearing element 116 for varying the length or height of the pusher element.

Figure 10:
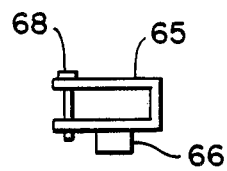
FIG. 10 is a side view of the magnet element bracket of the Hall effect transducer retrofitting kit.

Another application of the self-contained HET assembly 130 of FIG. 17 in retrofitting a conventional mechanical analog pressure gauge 50 is illustrated in FIG. 19. According to this embodiment of the invention, the self-contained HET assembly 130 is fitted into the back of a pressure gauge in a manner similar to the HET mounting bracket 70 shown in FIGS. 8 and 9. According to the embodiment of the invention in FIG. 19, however, there is no separate mounting bracket 65 for the permanent magnet element as shown in FIGS. 8 and 10 nor is the permanent magnet element bonded to the Bourdon tube as shown in FIG. 7B. Rather, the permanent magnet element 102 is suspended in juxtaposition relative to the HET 106 within the self-contained HET assembly 130 itself and the magnetic field of the permanent magnet element 102 provides its own suspension and self-biasing spring action within HET enhancer sleeve 100. The entire sub-assembly 115 fits within the space or locus 85 below the top of the arc of the Bourdon tube 52 which is shown in the illustration of a prior art mechanical analog pressure gauge 50 in FIG. 6.

A feature and advantage of the self-contained HET assembly 130 of the present invention is that neither the weight of the magnet element nor the weight of a bracket is borne by the Bourdon tube thereby minimizing distortion of the mechanical analog output of the Bourdon tube in response to variations in the pressure of a gas applied at the inlet of the Bourdon tube. With the sub-assembly 115 seated within the locus 85 below the arc of the Bourdon tube, the assembly 130 is secured in position to the reference mounting or housing of the pressure gauge 50 by closure of the back cover 82 over the pressure gauge 50 and assembly 130 and the placement of the screws 88 through the holes provided in the back of the cover 82 and the holes 134 in the mounting board 120 of the HET assembly 130. Upon closure, the external socket 126 protrudes from the back of the cover 182 through hole 80 provided for that purpose.

A feature and advantage of retrofitting the mechanical analog pressure gauge 50 with the self-contained HET assembly 130 is that attachments to the Bourdon tube are eliminated and forces or pressures on the Bourdon tube which might cause distortion of the mechanical analog output are minimized. Furthermore, the self-contained HET assembly 130 may be varied in geometry and dimensions for retrofitting pressure gauges and instruments with pressure tubes or other parameter responsive structures of any geometry and configuration including helical and twist tubes and structures with assembly interposed between the gauge or instrument housing and the pressure tube or other parameter responsive structure.

Further variations and improvement features for incorporation in the Hall effect transducer assembly are illustrated in FIGS. 22 - 22. In FIGS. 20 and 20A there is shown a support block 150 of nonmagnetic, nonpermeable materials such as a nylon block suitable for use for example in place of the support 105 in the self-contained Hall effect transducer assembly 130 shown in FIG. 17. A Hall effect transducer 152 is secured on the side of the support block 150 for example on a mounting board with printed circuit leads as heretofore described. The support block 150 is formed with a threaded recess or bore 154 for receiving an HET enhancer 155 in the form of a tube section or sleeve threaded on the outside with threads complementary to the threaded bore 154. The HET enhancer or sleeve 155 is made of magnetically permeable material and is seated in the threaded bore 154 by rotation to a desired depth as shown in FIG. 20A.

A feature and advantage of the embodiment of the invention and HET enhancer illustrated in FIGS. 20 and 20A is that the spacing of the sleeve or HET enhancer 155 relative to the HET 152 may be adjusted for achieving the desired response curve characteristics of voltage output from HET 152 versus displacement of a magnet element received in the magnet receiver sleeve 155. By this expedient, rotational adjustment of the depth of seating of the sleeve 155 in threaded bore 154 may be used to adjust the characteristic response curve to achieve, for example, a desired slope of voltage output versus displacement and therefore sensitivity of response, and to extend or enhance the linear range of the voltage output from HET 152 versus displacement of the magnet element as illustrated in the graph of FIG. 23.

Further embodiments of the magnet element are illustrated in FIGS. 21–22. As shown in FIGS. 21 and 21A, the magnet element 160 comprising, for example, a cylinder permanent magnet is formed with a pusher or push bearing extension 162 of nonmagnetic material, and a screw 164 at the head of the pusher which may be variably adjusted in depth in a threaded bore 165 formed in the pusher 162. By this expedient the length of the pusher 162 may be adjusted for setting the initial spacing between the permanent magnet element 160 and a Hall effect transducer such as HET 152 part of an HET assembly according to the invention such as HET assembly 130. The initial spacing adjustment screw 164 abuts against a surface of a parameter responsive structure for imparting the pushing action to the magnet element 160 upon expansion and contraction of the parameter responsive structure. To this end the screw 164 may be made of plastic material such as nylon to avoid damage to the surface of a parameter responsive structure.

A further variation of the permanent magnet element is illustrated in FIG. 22 where the permanent magnet element 170 is formed or fitted with a pointed tip 172 of magnetic material with the point oriented in the direction of the Hall effect transducer, for example HET 152. The pusher 174 of nonmagnetic material is joined to the magnet element 170 on the side opposite the pointed magnetic tip 172. The pointed end 172 on the permanent magnet 170 has the effect of shifting the response curve of the voltage output of the HET versus displacement of the magnet element so that even the initial displacements of the magnet element occur in the linear range of output of the Hall effect transducer. A feature and advantage of this result is that the pointed or tipped magnet permits accommodating the Hall effect transducer assembly within a smaller space for displacement of the magnet element in response to expansion and contraction of a parameter responsive structure while remaining within the linear range of the HET. This may have application when incorporating or interposing the self-contained HET assembly in gauges and instruments of unusual geometry or with parameter responsive structure of confining or restrictive configuration.

In the foregoing examples the self-contained HET assembly has been described with reference to fabrication from a number of elements combined to provide the final HET assembly 130 such as for example illustrated in FIG. 17. The elements of the HET assembly may also be formed together, however, as a unitary assembly or unit using injection molding for single piece construction of the self-contained Hall effect transducer assembly such as the HET assembly 130 shown in FIG. 17.

Furthermore, in the various foregoing example embodiments, the HET enhancer or magnet element receiver sleeve, e.g. 90, 100, 155, may itself be magnetized as a permanent magnet receiver sleeve with an axis of magnetization, for example parallel to the axis of magnetization of the magnet element and oriented in the same direction or in the opposite direction. The permanent magnet HET enhancer sleeve may be formed to enhance and strengthen the self-biasing magnetic spring action of the magnet element relative to the HET enhancer sleeve and also further enhance the linearity and sensitivity of response of the HET voltage output versus displacement of the magnet element.

While the invention has been described with reference to particular example embodiments of parameter responsive structures such as barometer and altimeter bellows and capsules, hygrometer tubes of the present invention, Bourdon tubes and pressure tubes of various geometries and configurations, and proving rings, the invention is also applicable to other responsive structures such as temperature responsive metal structures which expand and contract causing a component of motion and displacement along at least one direction in response to changes in ambient temperature. In addition to the hygrometer tube, other humidity and moisture responsive structures may be used, for example a synthetic hair, coupled under tension which expands and contracts with humidity. The synthetic hair may be coupled under tension to one of the magnet element or HET for displacement of one relative to the other upon expansion and contraction of the synthetic hair with variations in humidity or ambient moisture.

Furthermore, while the self-contained Hall effect transducer assembly has been described with reference to particular example embodiments, the magnet element and Hall effect transducer may be mounted on the assembly in juxtaposition for variable spacing or displacement in response to changes in a selected parameter and expansion and contraction of a parameter responsive structure with a variety of spring restoring means. For example, instead of or in addition to using the sleeve of magnetically permeable material also referred to herein as the HET enhancer which provides a "magnetic spring" restoring action, the permanent magnet element may be mounted in juxtaposition spaced from the Hall effect transducer by a piece of a spring foam, for example bonded between the magnet element and Hall effect transducer or bonded to the assembly support to provide the desired initial spacing and restoring spring action.

Alternatively, the permanent magnet element may be suspended or juxtaposed relative to the Hall effect transducer by a spring such as, for example, a leaf spring mounted on the assembly support for relative displacement between the permanent magnet element and Hall effect transducer with spring restoring action. Thus, the magnet element receiver or sleeve of permeable material in the described examples provides one example embodiment of the alternative means for mounting, suspension and relative juxtaposition of the permanent magnet and HET incorporated in the self-contained Hall effect transducer assembly according to the present invention. The invention is therefore intended to cover all modifications and equivalents within the scope of the following claims.

I claim:

1. A parameter sensor and monitor comprising:
   a parameter responsive structure constructed and arranged for expansion and contraction causing a component of motion and displacement along at least one direction in response to variations of a selected parameter;
   a reference mounting supporting the parameter responsive structure;
   a magnet element;
   a linear Hall effect transducer;
   one of said magnet element and Hall effect transducer being secured relative to the reference mounting in alignment with a selected direction of a component of motion and displacement caused by expansion and contraction of the parameter responsive structure;
   the other of said magnet element and Hall effect transducer being mounted for translation along said selected direction of motion or displacement in response to expansion and contraction of the parameter responsive structure;
   said magnet element and linear Hall effect transducer being mounted in spaced juxtaposition relative to each other for variable spacing in response to changes in a parameter causing expansion and contraction of the parameter responsive structure whereby the linear Hall effect transducer generates a variable output signal corresponding to variations in the selected parameter;
   and Hall effect transducer enhancer means comprising magnetically permeable material for enhancing the linearity and sensitivity of the Hall effect transducer output voltage response to relative displacement with respect to the magnet element.

2. The apparatus of claim 1 wherein the other of said magnet element and Hall effect transducer is secured to the parameter responsive structure and wherein said reference mounting comprises variable coupling means for varying and adjusting the spacing between the magnet element and Hall effect transducer for establishing a desired initial spacing.

3. The apparatus of claim 1 wherein the parameter responsive structure comprises an evacuated bellows or capsule which expands and contracts along a center axis through the center of the bellows or capsule in response to variations in ambient pressure.

4. The apparatus of claim 3 wherein the reference mounting comprises a base and a parallel support spaced from the base and wherein said variable coupling means comprises adjustable threaded spacing means between the substantially parallel base and support.

5. The apparatus of claim 4 wherein the evacuated bellows or capsule is secured at its center on one side to the substantially parallel support, wherein the magnet element is secured to the center of said bellows or capsule on the other side and wherein the linear Hall effect transducer is secured to the base in alignment with the center axis of the bellows or capsule.

6. The apparatus of claim 3 wherein the pressure sensor and monitor comprises an altimeter.

7. The apparatus of claim 1 wherein the ambient parameter responsive structure comprises an elongate tube or hollow cylinder of hydroscopic plastic material for expansion and contraction causing a component of motion and displacement along the elongate axis of the tube or hollow cylinder in response to variations in ambient humidity.

8. The apparatus of claim 7 wherein the reference mounting comprises a base, a first projecting support comprising first support means for mounting and supporting the first end of the tube or hollow cylinder in fixed position with the second end of the tube or hollow cylinder freely extending and a second projecting support spaced from the free second end of the tube or hollow cylinder in alignment with the elongate axis of the tube or hollow cylinder.

9. The apparatus of claim 8 wherein the magnet element is secured at the free second end of the tube or hollow cylinder and wherein the Hall effect transducer is mounted on the second projecting support spaced from said magnet element in alignment with the elongate axis of the tube or hollow cylinder.

10. The apparatus of claim 9 wherein the first projecting support is adjustably secured to the base for sliding adjustment of the position of the first projecting support to vary and set the initial spacing between the magnet element and linear Hall effect transducer.

11. The apparatus of claim 9 wherein the second projecting support comprises a printed circuit board containing said Hall effect transducer and amplifier means for amplifying the output of the Hall effect transducer.

12. The apparatus of claim 7 wherein said tube or hollow cylinder comprises cellulose acetate.

13. The apparatus of claim 1 wherein the parameter responsive structure comprises a Bourdon tube in the configuration of an arc fixed at one end to the reference mounting and wherein the selected direction of a component of motion and displacement caused by expansion and contraction is approximately a chord of the arc.

14. The apparatus of claim 13 wherein the magnet element is secured to the arc of the Bourdon tube along said chord of the arc and wherein the Hall effect transducer is secured with reference to the fixed end of the arc of the Bourdon tube.

15. The apparatus of claim 14 wherein the Bourdon tube comprises a component of a mechanical analog pressure gauge, wherein the reference mounting comprises the conventional pressure gauge housing, and wherein the magnet element and linear Hall effect transducer comprise a retrofitting kit for retrofitting the conventional mechanical analog pressure gauge for electrical signal readout, said retrofitting kit comprising a first bracket with the magnet element secured to the bracket, said first bracket constructed and arranged for engaging and coupling to the arc of the Bourdon tube, said retrofitting kit further comprising a second bracket constructed and arranged for coupling relative to the conventional pressure gauge housing and fixed end of the Bourdon tube, said Hall effect transducer being secured to the second bracket for juxtaposition relative to the magnet element for variable spacing between the magnet element and Hall effect transducer upon expansion and contraction of the Bourdon tube causing a component of motion and displacement along said chord of the arc.

16. The apparatus of claim 13 further comprising a mounting assembly for mounting the magnet element and Hall effect transducer for relative displacement in response to expansion and contraction of the Bourdon tube comprising a support of nonmagnetic material, said Hall effect transducer being mounted on the support, and wherein the HET enhancer means comprises a hollow tube or sleeve of magnetically permeable material mounted on the support in spaced relationship relative to the Hall effect transducer, said magnet element having a cross sectional configuration complementary with the inside of the hollow tube or sleeve for seating within and sliding motion back and forth within the tube or sleeve, said magnet element being magnetized with magnetic axis oriented for self-biasing magnetic spring action of the magnet element within the tube or sleeve, the wall of said tube or sleeve providing a magnetic circuit for the magnetic lines of force from the magnet element, said magnet element further formed with pusher means of nonmagnetic material secured to the magnet element and extending beyond the end of the tube or sleeve for engaging or abutting the Bourdon tube along the selected direction of a component of motion and displacement caused by expansion and contraction whereby the magnet element is suspended in spaced juxtaposition relative to the Hall effect transducer for sliding motion back and forth when the pusher means is moved back and forth by expansion and contraction of the Bourdon tube.

17. The apparatus of claim 16 wherein the hollow tube or sleeve of magnetically permeable material is of cylindrical configuration and wherein the magnet element comprises a cylinder dimensioned for seating within and sliding motion back and forth within the tube or annulus.

18. The apparatus of claim 17 wherein the mounting assembly comprises sleeve mounting adjustment means for adjusting the spacing of the tube or sleeve of magnetically permeable material relative to the Hall effect transducer for varying the position of the magnetic circuit provided by the wall of the tube or sleeve relative to the Hall effect transducer.

19. The apparatus of claim 18 wherein the sleeve mounting adjustment means comprises a threaded receiver for receiving the tube or sleeve and wherein the outside of the tube or sleeve is threaded for variable spacing and positioning within the receiver by rotation of the tube or sleeve.

20. The apparatus of claim 16 wherein the pusher means is adjustable in length for adjusting the initial spacing between the magnet element and Hall effect transducer.

21. The apparatus of claim 1 further comprising a mounting assembly for mounting the magnet element and Hall effect transducer for relative displacement in response to expansion and contraction of the parameter responsive structure, said mounting assembly comprising a support of nonmagnetic material, said Hall effect transducer being mounted on the support, and spring mounting means coupled to the support and mounting said magnet element for displacement relative to the Hall effect transducer by pushing action.

22. The apparatus of claim 21 wherein the spring mounting means comprises a magnet element receiver of magnetically permeable material mounted on the support for receiving and suspending the magnet element in its own magnetic field in spaced relationship to the Hall effect transducer for translation and recovery and for back and forth motion of the magnet element in the magnet element receiver relative to the Hall effect transducer in response to pushing action, said magnet element receiver comprising the HET enhancer means.

23. The apparatus of claim 22 wherein the magnet element comprises non-magnetic pusher means extending beyond the magnet element receiver for abutting against the parameter responsive structure.

24. The apparatus of claim 1 wherein the ambient parameter responsive structure comprises a ring force gauge in the configuration of a ring or annulus having at least one side comprising the reference mounting, said ring force gauge being responsive to mass, force or weight and wherein the selected directional axis of expansion and contraction comprises a diameter of the ring or annulus through the reference mounting side of the ring or annulus.

25. The apparatus of claim 24 further comprising a mounting assembly for mounting the magnet element and Hall effect transducer for relative translation in response to expansion and contraction of the ring force gauge comprising a support of nonmagnetic material, said Hall effect transducer being mounted on the support, and wherein the HET enhancer means comprises a magnet element receiver of magnetically permeable material mounted on the support and constructed and arranged for seating and suspending the magnet element in its own magnetic field in spaced relationship relative to the Hall effect transducer and for back and forth motion of the magnet element in the magnet element receiver relative to the Hall effect transducer in response to pushing action.

26. The apparatus of claim 25 wherein the magnet element receiver comprises a hollow tube or sleeve of magnetically permeable material mounted on the support and wherein the magnet element is formed with cross-sectional configuration complementary to the hollow tube or sleeve for seating and sliding motion within the hollow tube or sleeve.

27. The apparatus of claim 1 wherein the HET enhancer means comprises a magnet element receiver of magnetically permeable material in the configuration of a sleeve or tube section for receiving and suspending the magnet element in its own magnetic field in spaced relationship relative to the Hall effect transducer.

28. The apparatus of claim 27 wherein the magnet element receiver is itself magnetized.

29. An ambient pressure sensor and monitor comprising:
 an evacuated bellows or capsule having a central axis and being constructed and arranged for expansion and contraction along the axis in response to variations in ambient pressure;
 a magnet element;
 a linear Hall effect sensor;
 one of said magnet element and Hall effect sensor being secured to the first side of said bellows or capsule at the central axis;

a reference mounting comprising a base and parallel support and adjustable coupling means joining the base and parallel support for adjusting the spacing between the base and parallel support, said bellows or capsule being secured on its second side at the central axis of the bellows or capsule to the parallel support and the other of said magnet element and Hall effect transducer being secured to the base in alignment with the central axis of the bellows or capsule;

said magnet element and linear Hall effect transducer being in spaced juxtaposition relative to each other for variable spacing in response to changes in ambient pressure whereby the linear Hall effect sensor generates a variable output signal corresponding to the ambient pressure.

30. The apparatus of claim 29 wherein the magnet element is secured to the center of the first side of the bellows or capsule and the Hall effect sensor is secured to the base of the reference mounting.

31. The apparatus of claim 29 wherein the ambient pressure sensor and monitor comprises an altimeter.

32. A Hall effect transducer assembly comprising:
a Hall effect sensor;
a magnet element;
a support of nonmagnetic material, said Hall effect sensor being mounted on the support;
a manget element receiver of magnetically permeable material mounted on the support in spaced relationship relative to the Hall sensor, said magnet element receiver constructed and arranged for receiving and suspending the magnet element in its own magnetic field in spaced juxtaposition relative to the Hall effect sensor, said magnet element being seated and suspended in the magnet element receiver for displacement relative to the Hall effect sensor in response to pushing action;

said magnet receiver comprising a hollow tube or sleeve of magnetically permeable material, said magnet element being formed with a cross-sectional configuration complementary to the inside of the tube or sleeve for sliding motion within the tube or sleeve, the wall of said tube or sleeve providing a magnetic circuit for the magnetic field lines of the magnet element, said magnet element being magnetized along an axis of magnetization for substantial self-biasing spring action of the magnet element seated and suspended within the tube or sleeve;

said magnet element being formed with a pusher secured to the side of the magnet element and projection beyond the end of the tube or sleeve for application of pushing action to the magnet element; and a parameter responsive structure having a moving element constructed and arranged for expansion and contraction with a component of motion and displacement along at least one direction in response to variations of a selected parameter, said Hall effect transducer assembly being mounted on the parameter responsive structure with the moving element of the parameter responsive structure abutting against the magnet element pusher for pushing action on the pusher along the direction of a component of motion and displacement coinciding with the direction of sliding motion of the magnet element within the tube or sleeve.

33. The apparatus of claim 32 wherein the hollow tube or sleeve comprises a permanent magnet.

* * * * *